Oct. 17, 1967   D. H. THORBURN   3,347,461
PNEUMATIC-HYDRAULIC PULSE ACTUATOR
Filed Oct. 4, 1965
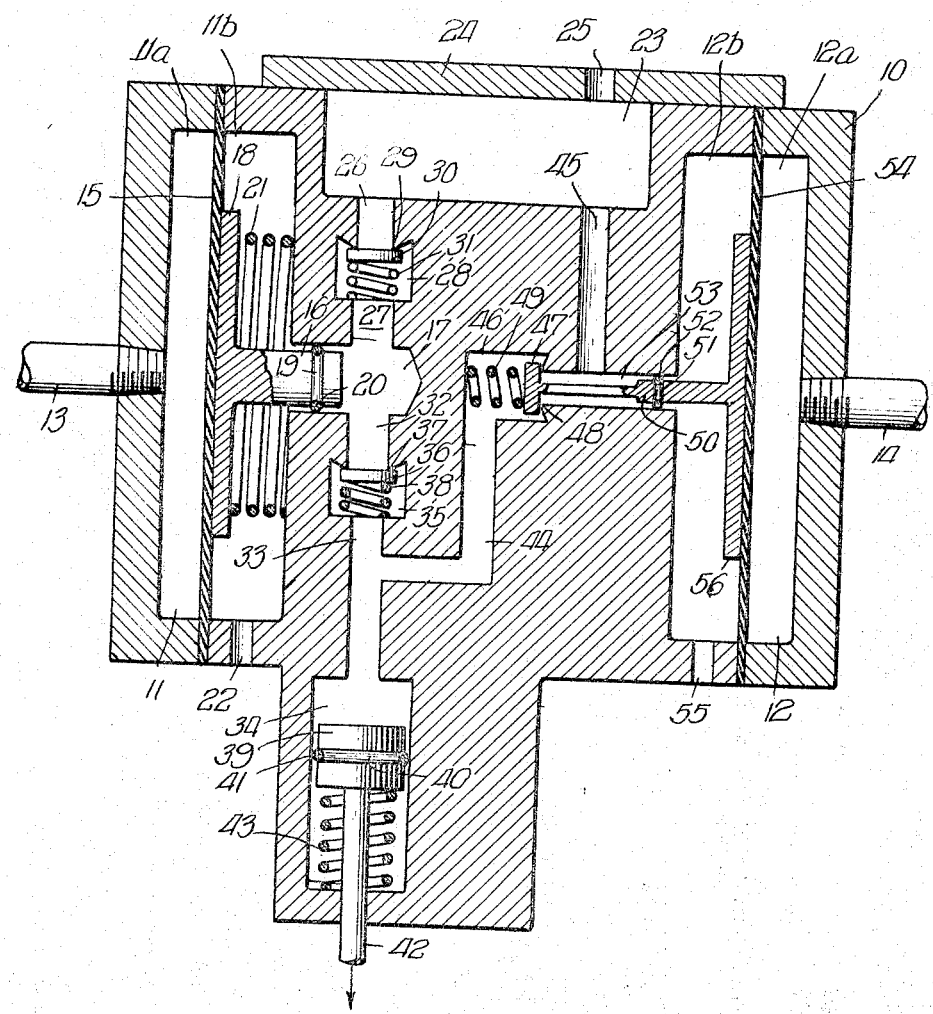
Inventor:
David H Thorburn,
By Hume, Troen, Clement & Hume.
Attys.

United States Patent Office 3,347,461
Patented Oct. 17, 1967

3,347,461
PNEUMATIC-HYDRAULIC PULSE ACTUATOR
David H. Thorburn, Oak Park, Ill., assignor to The Powers Regulator Company, Skokie, Ill., a corporation of Illinois
Filed Oct. 4, 1965, Ser. No. 492,584
9 Claims. (Cl. 236—79)

This invention pertains to a pneumatic-hydraulic actuator device and in particular to a hydraulic actuator device which is responsive to digital pneumatic control signals.

United States Patent No. 3,319,644, issued May 16, 1967 discloses a pneumatic control unit for converting an analog pressure signal into a digital pressure signal. As discussed therein, one of the advantages of a digital output signal is that it may be utilized to operate regulating devices which are relatively insentitive to the pressure effects of the regulated medium. For example, in an air conditioning system wherein the room temperature is controlled by hot or cold water and the water flow rate is regulated according to the room temperature, the practice is to regulate the flow rate by means of a motor valve. In a conventional system the motor valve is controlled by means of an analog pressure signal which is generated by suitable relays acting in response to signals emanating from a temperature sensing device. The difficulty with such a motor valve is that the pressure effects of the water flowing through the valve react against the analog control pressure signal so as to cause inconsistencies in the degree of valve opening for a given pressure signal.

A system which provides digital pneumatic control signals permits the use of motor valve actuator devices which are virtually unaffected by the pressure effects of the medium which is regulated by the valve. For example, United States Patent No. 3,319,644, referred to above, shows an actuator adapted to be connected to a gate valve or other suitable regulating means. In that actuator, the digital pressure signals are insulated from the pressure effects of the regulating medium through the use of a mechanical actuating arrangement.

In many systems, however, it may be desirable to employ hydraulic actuating means to insulate the pneumatic digital control signals from the pressure effects of the regulated medium.

Accordingly, one of the principal objects of this invention is an actuating device which is substantially unaffected by external influences acting upon the actuated instrumentality.

Another object of this invention is the provision of hydraulic actuating means responsive to digital pneumatic signals.

This invention has as a further object a device for actuating a valve or other regulating instrumentality in response to a pulsed pneumatic control signal, wherein the control signal is insulated from the pressure effects of the regulated medium.

Yet another object of this invention resides in the provision of a simple, economical, and extremely reliable pneumatic-hydraulic actuator suitable for use with a pneumatic control unit of the type described in United States Patent No. 3,319,644.

It is a specific object of the present invention to provide an actuating device comprising means for receiving a pulsed pneumtaic signal, and means for converting this signal into a hydraulic displacement for actuating a regulating device, wherein the signal is unaffected by feedback from the regulating device.

A fuller understanding and appreciation of the foregoing objects as well as others will be gained from a consideration of the specification and claims, with reference to the following drawing, in which;

The drawing shows a cross-sectional view of an actuating device embodying the claimed invention.

Referring now to the drawing, there is shown a preferred form of actuator device which embodies the claimed invention. For purposes of convenience, the invention at various times will be described as used in conjunction with specific types of control systems such as those used in heating and cooling. It will be understood that such specific references are by way of example and are not to be construed as limitations. The subject invention may be utilized wherever it will perform in the manner intended and provide the desired results.

As illustrated in the drawing, the actuator device comprises a casing 10, and an actuator cylinder 34 hydraulically associated with a pair of signal chambers 11 and 12. The signal chamber 11 is connected to a source of pneumatic control pulses by means of a conduit 13. A diaphragm 15 divides the signal chamber 11 into two compartments, 11a and 11b. The compartment 11b is maintained at atmospheric pressure by a vent 22.

Similarly, the signal chamber 12 is connected to a source of pneumatic control pulses by means of a conduit 14. A diaphragm 54 likewise divides the signal chamber 12 into two compartments 12a and 12b, and the compartment 12b is maintained at atmospheric pressure by a vent 55.

The diaphragms 15 and 54 are of the usual type, in that they are clamped at their edges and are impervious to pneumatic fluid and are adapted to be flexed by an imbalance in pressure.

A piston 16 is disposed for operation in a cylinder 17. The piston 16 has a shoulder 18 which is suitably attached to the diaphragm 15 such that a flexion of the diaphragm will cause the piston to displace within the cylinder 17. The piston 16 is provided with a groove 19 and a piston ring 20 which fits in the groove and prevents hydraulic fluid in the cylinder 17 from reaching the compartment 11b of the signal chamber 11.

A hydraulic fluid reservoir 23 partially filled with hydraulic fluid is connected to the cylinder 17 by means of conduits 26 and 27. Covering the reservoir 23 is a cover plate 24 having a vent 25. The hydraulic fluid in the reservoir 23 is maintained at atmospheric pressure by means of the vent 25.

Disposed between the conduits 26 and 27 is a valving chamber 28. Within the valving chamber 28, a check valve 30 is suitably biased into cooperation with a valve seat 29 by a compression spring 31. The check valve 30 is arranged so that it will prevent the flow of hydraulic fluid from the cylinder 17, through the conduits 27 and 26, to the reservoir 23. However, hydraulic fluid will be permitted to flow in the reverse direction, from the reservoir 23 through the conduits 26 and 27 to the cylinder 17, when the pressure in the conduit 27 falls below atmospheric.

The actuator cylinder 34 is connected to the cylinder 17 by means of conduits 33 and 32. Disposed within the actuator cylinder 34 is a piston 39 having a groove 40 with a piston ring 41 therein. Attached to the piston 39 is an actuator stem 42 which is adapted to operate a control valve or other suitable regulatory mechanism (not shown). The piston 39 is biased upwardly by a compression spring 43.

Disposed between the conduits 32 and 33 is a valving chamber 35 containing a check valve 36 which cooperates with a valve seat 37. The check valve 36 is suitably biased against the valve seat 37 by a compression spring 38 such that hydraulic fluid in the actuator cylinder 34 is prevented from reaching the cylinder 17 via the conduits 33 and 32. However, hydraulic fluid may flow from the cylinder 17 to the actuator cylinder 34 when the pressure in the conduit 32 exceeds the pressure in the conduit 33.

Actuator cylinder 34 is connected to the reservoir 23 by means of conduits 33, 44, 53 and 45. Disposed between and in communication with the conduits 44 and 53 is a valving chamber 46, which includes a check valve 47 suitably biased into cooperation with a valve seat 48 by a compression spring 49. As will become apparent, the check valve 47 is adapted to prevent the flow of hydraulic fluid from the reservoir 23 to the actuator cllinder 34. However, fluid is allowed to flow from the actuator cylinder 34 to the reservoir 23 when the check valve 47 is operated.

Disposed within the conduit 53 is a push rod 50 adapted to operate the check valve 47. The push rod 50 has a groove 51 and a ring 52 which serves to prevent the flow of hydraulic fluid from the conduit 53 into the compartment 12b of the signal chamber 12. The push rod 50 has a shoulder 56 which is attached to the diaphragm 54. When the diaphragm 54 is flexed the push rod 50 causes the check valve 47 to operate.

The operation of the actuating device is as follows: Assume, for example, that the conduits 13 and 14 are connected to a suitable source of pneumatic signal pulses, which pulses are generated in accordance with a temperature sensing control device and are intended to control the operation of a gate valve in a hot water line. Arbitrarily, let it be assumed that pulses received in the conduit 13 are intended to open the gate valve and those received in the conduit 14 are intended to close it, and further, that movement of the actuator stem 42 in the direction shown by the arrow will cause the gate valve to open.

When a pneumatic pulse is received in the compartment 11a through the conduit 13, the diaphragm 15 is caused to be flexed to the right due to the imbalance in pressure between the compartments 11a and 11b. The flexing of the diaphragm 15 causes the piston 16 to move to the right in cylinder 17, thus displacing hydraulic fluid. When the pulse terminates, the diaphragm 15 will return to its normal position, as will the piston 16, due to the force exerted by the compression spring 21. It should be apparent, however, that if the quiescent pressure in the conduit 13 and the compartment 11a is substantially less than atmospheric, the spring 21 will be unnecessary, since the atmospheric pressure in the compartment 11b will be sufficient to force the diaphragm 15 back to the left. If it is desired to prevent the diaphragm 15 from flexing to the left, beyond its normal position under quiescent conditions, a suitable stop may be provided.

The movement of the piston 16 to the right in the cylinder 17 creates an increase in the pressure in the conduit 32 over that in the conduit 33, and causes the check valve 36 to open, thus permitting hydraulic fluid to flow into the conduit 33 and thus into the actuating cylinder 34. The flow of hydraulic fluid into the actuator cylinder 34 causes the piston 39 and the actuator stem 42 to move in the direction shown by the arrow, thus opening the gate valve a predetermined amount.

As indicated previously, when the signal pulse terminates, the piston 16 returns to its normal position. This causes several things to occur. Since the withdrawal of the piston 16 from the cylinder 17 lowers the pressure in the conduit 27, the check valve 30 opens and allows hydraulic fluid from the reservoir 23 to flow into and refill the cylinder 17 via the conduits 26 and 27. At the same time, the pressure in the conduit 33 remains above that in the conduit 32 due to the force exerted by the compression spring 43 upon the piston 39. Thus, the check valve 36 closes and prevents the flow of hydraulic fluid from the actuator cylinder 34 to the cylinder 17. Also, because the pressure in the conduit 44 remains greater than the pressure in the conduit 53 all throughout the foregoing cycle of operation, the check valve 47 remains closed and prevents the flow of hydraulic fluid from the actuator cylinder 34 to the reservoir 23. Thus, upon withdrawal of the piston 16, the piston 39 remains stationary, and the gate valve operated by the actuator stem 42 remains partially opened.

If another pulse is received from the conduit 13, the foregoing cycle of operations repeats itself, and the piston 39 will be displaced further in the direction shown by the arrow. In this manner, the gate valve is operated by a series af pneumatic pulses received through the conduit 13, and the degree of opening of the gate valve is in proportion to the number of pulses received. After the series of pulses terminates and the system reverts to its quiescent state, the gate valve remains opened the desired amount.

Assume, now, that the control device senses a need to close the gate valve actuated by the actuator stem 42. A pulse or series of pulses will be generated by the control device and received through the conduit 14 into the compartment 12a of the signal chamber 12. A pulse received therein will cause the diaphragm 54 to flex, thus moving the push rod 50 to the left and causing the check valve 47 to open. Since the pressure in the actuator cylinder 34 and thus in the conduit 44 is greater than that in the conduit 53, hydraulic fluid will be permitted to flow from the actuator cylinder 34 to the reservoir 23. This flow of hydraulic fluid will continue until the pulse terminates. Upon termination of the pulse the diaphragm 54 will return to its normal position due to the force of the compression spring 49 and the check valve 47 will close, thus preventing further flow of hydraulic fluid from the actuator cylinder 34 to the reservoir 23. As can be seen, while the check valve 47 is open, during the duration of the pulse, the piston 39 is allowed to move in a direction opposite to that shown by the arrow, thus causing the gate valve to be closed by the movement of the actuator stem 42. The piston 39 will move a certain amount for each pulse received in the compartment 12a. Thus the degree of closure of the valve will be directly proportional to the number of pulses received through the conduit 14 into the compartment 12a. When the system returns to its quiescent state, all of the check valves 30, 36 and 47 are closed, and the piston 39 is held in position, thus maintaining the desired degree of gate valve opening or closure.

Again, if when the system reverts to its quiescent state, the pressure in the conduit 14 and the compartment 12a is substantially below atmospheric pressure, the compression spring 49 may be omitted, since the atmospheric pressure maintained in the compartment 12b will serve to return the diaphragm 54 to its normal unflexed position.

As is apparent from the foregoing, this invention provides virtually perfect insulation of the digital pneumatic pulses from the pressure effects of the medium which is controlled by the gate valve or other regulatory mechanism. When the system is in its quiescent state, with no pulses being received in either of the signal chambers 11 and 12, the check valves 36 and 47 remain closed, thus preventing any pressure effects which might be transmitted back through the actuator stem 42 from reaching the pneumatic portions of the device.

Although the invention has been described with a certain degree of particularity, it should be understood that the present disclosure has been made only by way of example. Consequently, numerous changes in the details of construction and the composition and arrangement of parts will be obvious to those having ordinary skill in the art, and may be resorted to without departing from the spirit and the scope of the invention as claimed.

What is claimed is:

1. An pneumatic-hydraulic actuating device comprising: means responsive to an input signal consisting of one or more pneumatic pulses, said means being adapted to provide successive mechanical displacements, one for each of said pulses; and hydraulic means cumulatively responsive to said mechanical displacements for operating a regulatory instrumentality in accordance with said input signal.

2. A pneumatic-hydraulic actuator device comprising: first means, including first and second portions each responsive to pneumatic pulses, for generating in response to said pneumatic pulses a hydraulic displacement proportional to the number of said pneumatic pulses; and second means responsive to said hydraulic displacement for operating a regulatory instrumentality.

3. In a pneumatic control unit including means for generating pneumatic pulse signals in accordance with a sensed variable and means for controlling said variable, the combination thereof with a pneumatic-hydraulic actuating device comprising: means responsive to said pulse signals for providing successive mechanical displacements, one for each of said pulse signals, and hydraulic means cumulatively responsive to said mechanical displacements for operating said means for controlling said variable.

4. An actuator device comprising: a hydraulic medium reservoir; a hydraulic cylinder provided with a piston adapted for movement in first and second directions and biased in said second direction, said piston being adapted for operating a control instrumentality; first means interconnected between said reservoir and said hydraulic cylinder for metering a predetermined amount of hydraulic medium to said hydraulic cylinder in response to a pulsed signal so as to move said piston in said first direction; and second means interconnected between said reservoir and said hydraulic cylinder for returning a predetermined amount of hydraulic medium to said reservoir in response to a pulsed signal so as to permit said biased piston to move in said second direction.

5. An actuator device as defined in claim 4 wherein said first means comprises: a variable volume chamber interconnected between said reservoir and said hydraulic cylinder; means responsive to an increase in pneumatic pressure to decrease the volume of said chamber and responsive to a decrease in pneumatic pressure to increase the volume of said chamber; means interconnected between said reservoir and said chamber for admitting a predetermined quantity of hydraulic medium to said chamber when the volume of said chamber is increased and for preventing return flow of hydraulic medium from said chamber to said reservoir; and means interconnected between said chamber and said hydraulic cylinder for permitting flow of hydraulic medium from said chamber to said hydraulic cylinder when the volume of said chamber is decreased and for preventing return flow of hydraulic medium from said hydraulic cylinder to said chamber.

6. An actuator device as defined in claim 4, wherein said second means comprises: a valve interconnected between said reservoir and said hydraulic cylinder; means biasing said valve normally closed; and means responsive to an increase in pneumatic pressure to open said valve to permit flow of hydraulic medium from said hydraulic cylinder to said reservoir.

7. In a pneumatic control unit including means for generating pulsed pneumatic signals, each of said signals consisting of one or more pneumatic pulses, and a control instrumentality, the combination thereof with an actuator device comprising: a hydraulic medium reservoir; a hydraulic cylinder provided with a piston adapted for movement in first and second directions and biased in said second direction, said piston having a rod for operating a control instrumentality; first means interconnected between said reservoir and said hydraulic cylinder for metering a predetermined amount of hydraulic medium to said hydraulic cylinder in response to a pulsed signal so as to move said piston in said first direction; and second means interconnected between said reservoir and said hydraulic cylinder for returning a predetermined amount of hydraulic medium to said reservoir in response to a pulsed signal so as to permit said biased piston to move in said second direction.

8. An actutaor device, responsive to an open signal and a close signal each consisting of one or more serial pneumatic pulses, for operating a fluid control mechanism in accordance with said open and close signals, comprising: a hydraulic medium reservoir; a first cylinder; a first piston disposed in said first cylinder for varying the volume of said first cylinder; first conduit means for communicating hydraulic medium from said reservoir to said first cylinder; a first check valve disposed in said first conduit means for preventing the flow of hydraulic medium from said first cylinder to said reservoir; first receiver means responsive to said open signal for operating said first piston in said first cylinder to decrease the volume of said first cylinder so as to force a predetermined amount of hydraulic medium from said first cylinder; a second cylinder adapted to receive hydraulic medium from said first cylinder; a second piston disposed in said second cylinder and adapted to open and close said fluid control mechanism in accordance with the amount of hydraulic medium in said second cylinder and biased in a direction to close said fluid control mechanism; second conduit means for communicating hydraulic medium from said first cylinder to said second cylinder; a second check valve disposed in said second conduit means for preventing the flow of hydraulic medium from said second cylinder to said first cylinder; third conduit means for communicating hydraulic medium from said second cylinder to said reservoir; a third check valve disposed in said third conduit means, said third check valve being adapted to prevent the flow of hydraulic medium from said reservoir to said second cylinder, and being further adapted to permit the flow of a predetermined amount of hydraulic medium from said second cylinder to said reservoir when said third check valve is operated; and second receiving means responsive to said close signal for operating said third check valve.

9. In a pneumatic control unit including means for generating pulsed pneumatic open and close signals, each of said signals consisting of one or more pneumatic pulses, and a fluid control mechanism, the combination thereof with an actuator device comprising: a hydraulic medium reservoir; a first cylinder; a first piston disposed in said first cylinder for varying the volume of said first cylinder; first conduit means for communicating hydraulic medium from said reservoir to said first cylinder; a first check valve disposed in said first conduit means for preventing the flow of hydraulic medium from said first cylinder to said reservoir; first receiver means responsive to said open signal for operating said first piston in said first cylinder to decrease the volume of said first cylinder so as to force a predetermined amount of hydraulic medium from said first cylinder; a second cylinder adapted to receive hydraulic medium from said first cylinder; a second piston disposed in said second cylinder and adapted to open and close said fluid control mechanism in accordance with the amount of hydraulic medium in said second cylinder and biased in a direction to close said fluid control mechanism; second conduit means for communicating hydraulic medium from said first cylinder to said second cylinder; a second check valve disposed in said second conduit means for preventing the flow of hydraulic medium from said second cylinder to said first cylinder; third conduit means for communicating hydraulic medium from said second cylinder to said reservoir; a third check valve disposed in said third conduit means, said third check valve being adapted to prevent the flow of hydraulic medium from said reservoir to said second cylinder, and being further adapted to permit the flow of a predetermined amount of hydraulic medium from said second cylinder to said reservoir when said third check valve is operated; and second receiving means responsive to said close signal for operating said third check valve.

References Cited

UNITED STATES PATENTS

| | | | |
|---|---|---|---|
| 1,771,170 | 7/1930 | Eule | 236—79 X |
| 1,772,403 | 8/1930 | Smoot | 91—460 |
| 1,898,572 | 2/1933 | Rogatz | 236—86 |
| 2,052,375 | 8/1936 | Wunsch | 236—15 |
| 2,441,405 | 5/1948 | Fitch | 236—82 |
| 2,867,191 | 1/1959 | Herrmann | 91—80 |
| 3,069,088 | 12/1962 | Scharpf | 236—83 |

WILLIAM J. WYE, *Primary Examiner.*